United States Patent
Ekambaram et al.

(10) Patent No.: US 10,607,233 B2
(45) Date of Patent: Mar. 31, 2020

(54) AUTOMATED REVIEW VALIDATOR

(71) Applicant: INTERNATIONAL BUSINESS MACHINES CORPORATION, Armonk, NY (US)

(72) Inventors: Vijay Ekambaram, Tamilnadu (IN); Ashish K. Mathur, Bangalore (IN); Nitendra Rajput, Haryana (IN); Vivek Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 14/988,935

(22) Filed: Jan. 6, 2016

(65) Prior Publication Data
US 2017/0193524 A1 Jul. 6, 2017

(51) Int. Cl.
*G06Q 30/00* (2012.01)
*G06Q 30/02* (2012.01)
(Continued)

(52) U.S. Cl.
CPC ... *G06Q 30/0185* (2013.01); *G06F 16/24575* (2019.01); *G06F 16/9535* (2019.01); *G06Q 30/0282* (2013.01)

(58) Field of Classification Search
CPC .......................... G06Q 30/0201; G06Q 10/06
(Continued)

(56) References Cited

U.S. PATENT DOCUMENTS 6,012,152 A * 1/2000 Douik ................. G06F 11/0709
714/26
6,820,072 B1 * 11/2004 Skaanning .......... G06F 11/3608
706/52
(Continued)

FOREIGN PATENT DOCUMENTS

| CN | 103064971 A | 4/2013 |
|---|---|---|
| CN | 104881796 A | 9/2015 |
| EP | 2765550 A1 | 8/2014 |

OTHER PUBLICATIONS

Peter Mell et al, The NIST Definition of Cloud Computing, National Institute of Standards and Technology, U.S. Department of Commerce, Special Publication 800-145, 2011.
(Continued)

*Primary Examiner* — Johnna R Loftis
(74) *Attorney, Agent, or Firm* — Patrick J. Daugherty; Daugherty & Del Zoppo Co., LPA

(57) ABSTRACT

In response to a posting of a negative review of an information technology item, external environmental context data is collected that comprehends processing environment attributes of an external process that interacts with the item in a reviewed performance of the item. An attribute of the item criticized in the review is correlated with an attribute of the external environmental context data as a function of contemporaneous time of occurrence. Degrees of likelihood as the principal cause of the negative review are determined for the attributes of the information technology item and for the correlated external environmental context data attribute.

(Continued)

The negative review is determined to be a false negative review if the degree of likelihood that the correlated attribute of the external environmental context data is the principal cause is higher than the degree of likelihood that the criticized attribute of the information technology item is the principal cause.

16 Claims, 5 Drawing Sheets

(51) Int. Cl.
  *G06F 16/9535* (2019.01)
  *G06F 16/2457* (2019.01)
(58) Field of Classification Search
  USPC ........................................................ 705/7.38
  See application file for complete search history.

(56) References Cited

U.S. PATENT DOCUMENTS

| | | | |
|---|---|---|---|
| 7,552,174 B1* | 6/2009 | Cramer | H04M 7/0024 709/203 |
| 7,933,926 B2 | 4/2011 | Ebert | |
| 8,108,255 B1 | 1/2012 | Robinson et al. | |
| 8,380,694 B2 | 2/2013 | Ruhl et al. | |
| 8,578,501 B1 | 11/2013 | Ogilvie | |
| 2005/0193055 A1* | 9/2005 | Angel | G06Q 30/02 709/202 |
| 2006/0020924 A1* | 1/2006 | Lo | G06F 11/0709 717/127 |
| 2006/0287989 A1* | 12/2006 | Glance | G06F 17/30587 |
| 2007/0061468 A1* | 3/2007 | Kelly | G06Q 10/10 709/227 |
| 2007/0074149 A1* | 3/2007 | Ognev | G06F 11/366 717/101 |
| 2010/0037166 A1* | 2/2010 | Chandrasekar | G06Q 30/02 715/769 |
| 2011/0173191 A1 | 7/2011 | Tsaparas et al. | |
| 2011/0225506 A1* | 9/2011 | Casalaina | G06F 17/30528 715/741 |
| 2013/0066800 A1 | 3/2013 | Falcone et al. | |
| 2013/0097497 A1* | 4/2013 | Matejka | G06F 3/048 715/705 |
| 2013/0144802 A1 | 6/2013 | Bank et al. | |
| 2013/0173491 A1 | 7/2013 | Natiions et al. | |
| 2013/0231989 A1 | 9/2013 | Ayyash | |
| 2013/0275554 A1 | 10/2013 | Smith | |
| 2014/0230053 A1 | 8/2014 | Mote et al. | |
| 2016/0065419 A1* | 3/2016 | Szilagyi | H04L 41/5067 709/224 |
| 2016/0260147 A1 | 9/2016 | King et al. | |

OTHER PUBLICATIONS

Mao Zheng et al, Adaptive Mobile Applications to Dynamic Context, Journal of Computer and Communications, http://dx.doi.org/10.4236/jcc.2014.29002, 2014.

Mike Kings, Researchers developing algorithms to detect fake reviews, Phys.org 2003-2015, Science X network, http://phys.org/news/2014-10-algorithms-fake.html, 2014.

Yohana Desta, How to Spot a Fake Online Review, Mashable, http://mashable.com/2014/05/29/fake-online-reviews-tips/, 2014.

Mouzakis et al, Socrates mobile app review dataset, Swinburne Research Bank, https://researchbank.swinburne.edu.au/vital/access/manager/Repository/swin:35267, 2013.

\* cited by examiner

US 10,607,233 B2

AUTOMATED REVIEW VALIDATOR

BACKGROUND

Users post reviews of Information Technology ("IT") items (applications, devices, services, etc.) in a wide variety of public and private forums, such as via the internet and other networked structures. The reviews may be posted via use of a variety of programmable device platforms, for example via use of applications executing on mobile phones, laptops, personal digital assistants (PDAs), desktop computers, etc. Such reviews are useful to other users using or considering acquisition of IT items, wherein the publication of favorable reviews may help to market or spread adoption the reviewed IT item, while publication of negative reviews may hurt marketing or adoption. For example, a negative review may cause a reader to decide not to purchase the reviewed IT item.

However, the accuracy and usefulness of qualitative information conveyed by the reviews with respect to any given reviewed information technology item may be highly dependent on user context defined by behavior, knowledge, actions and underlying resources deployed in utilizing the reviewed information technology that are unique to the reviewing user. More particularly, the root-cause of a poor performance attribute that causes a user to submit a review that rates a reviewed information technology item poorly may not be caused or otherwise related to performance of the reviewed information technology itself. For example, poor responsiveness of an executing application may be due to one or more of various, unfavorable context scenarios that are different from ("external" to) the attributes of the IT item itself, including poor current network conditions, low resource availability, executing the application on a low end device (one with a relatively older processor with small amounts of available memory relative to conventional devices), improperly configuring or operating the IT item or an underlying operating system, etc.

Accordingly, such external context factors and conditions may result in a perception of poor performance for a given IT item, even though it has been coded adequately and is actually performing at a high and desirable level. Thus, an IT item that is itself performing adequately may receive a negative review due to a poor experience by the reviewer, who in good faith believes (erroneously) that attributes of the IT item are the cause of the problem. Moreover, this negative review actually may actually have little or no accuracy or value in assessing the qualities of the reviewed IT item for other users who do not share the poor external context of the reviewer, and who will not experience the problems of the reviewing user but will instead experience adequate or even superior performance from using the same IT item.

BRIEF SUMMARY

In one aspect of the present invention, a method for an automated review validator. In response to a posting of a negative review by a reviewer of a performance of an information technology item, a processor collects external environmental context data that comprehends processing environment attributes of an external process that interacts with the information technology item in the reviewed performance of the information technology item. The external process attributes are separate from and independent of attributes of the information technology item, and the negative review posting includes structure review data. An attribute of the information technology item that is criticized in the negative review is correlated with an attribute of the external environmental context data as a function of contemporaneous times of occurrence. Degrees of likelihood are determined for each of the attributes of the information technology item and for the correlated attribute of the external environmental context data as the principal cause of the negative review. Thus, the negative review is determined to be a false negative review if the degree of likelihood that the correlated attribute of the external environmental context data is the principal cause is higher than the degree of likelihood that the criticized attribute of the information technology item is the principal cause.

In another aspect, a system has a hardware processor in circuit communication with a computer readable memory and a computer-readable storage medium having program instructions stored thereon. The processor executes the program instructions stored on the computer-readable storage medium via the computer readable memory. Thus, in response to a posting of a negative review by a reviewer of a performance of an information technology item, the processor collects external environmental context data that comprehends processing environment attributes of an external process that interacts with the information technology item in the reviewed performance of the information technology item. The external process attributes are separate from and independent of attributes of the information technology item, and the negative review posting includes structure review data. An attribute of the information technology item that is criticized in the negative review is correlated with an attribute of the external environmental context data as a function of contemporaneous times of occurrence. Degrees of likelihood are determined for each of the attributes of the information technology item and for the correlated attribute of the external environmental context data as the principal cause of the negative review. The negative review is determined to be a false negative review if the degree of likelihood that the correlated attribute of the external environmental context data is the principal cause is higher than the degree of likelihood that the criticized attribute of the information technology item is the principal cause.

In another aspect, a computer program product for an automated review validator. The computer readable program code includes instructions for execution which cause a processor to, in response to a posting of a negative review by a reviewer of a performance of an information technology item, collect external environmental context data that comprehends processing environment attributes of an external process that interacts with the information technology item in the reviewed performance of the information technology item. The external process attributes are separate from and independent of attributes of the information technology item, and the negative review posting includes structure review data. An attribute of the information technology item that is criticized in the negative review is correlated with an attribute of the external environmental context data as a function of contemporaneous times of occurrence. Degrees of likelihood are determined for each of the attributes of the information technology item and for the correlated attribute of the external environmental context data as the principal cause of the negative review. Thus, the negative review is determined to be a false negative review if the degree of likelihood that the correlated attribute of the external environmental context data is the principal cause is higher than the degree of likelihood that the criticized attribute of the information technology item is the principal cause

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
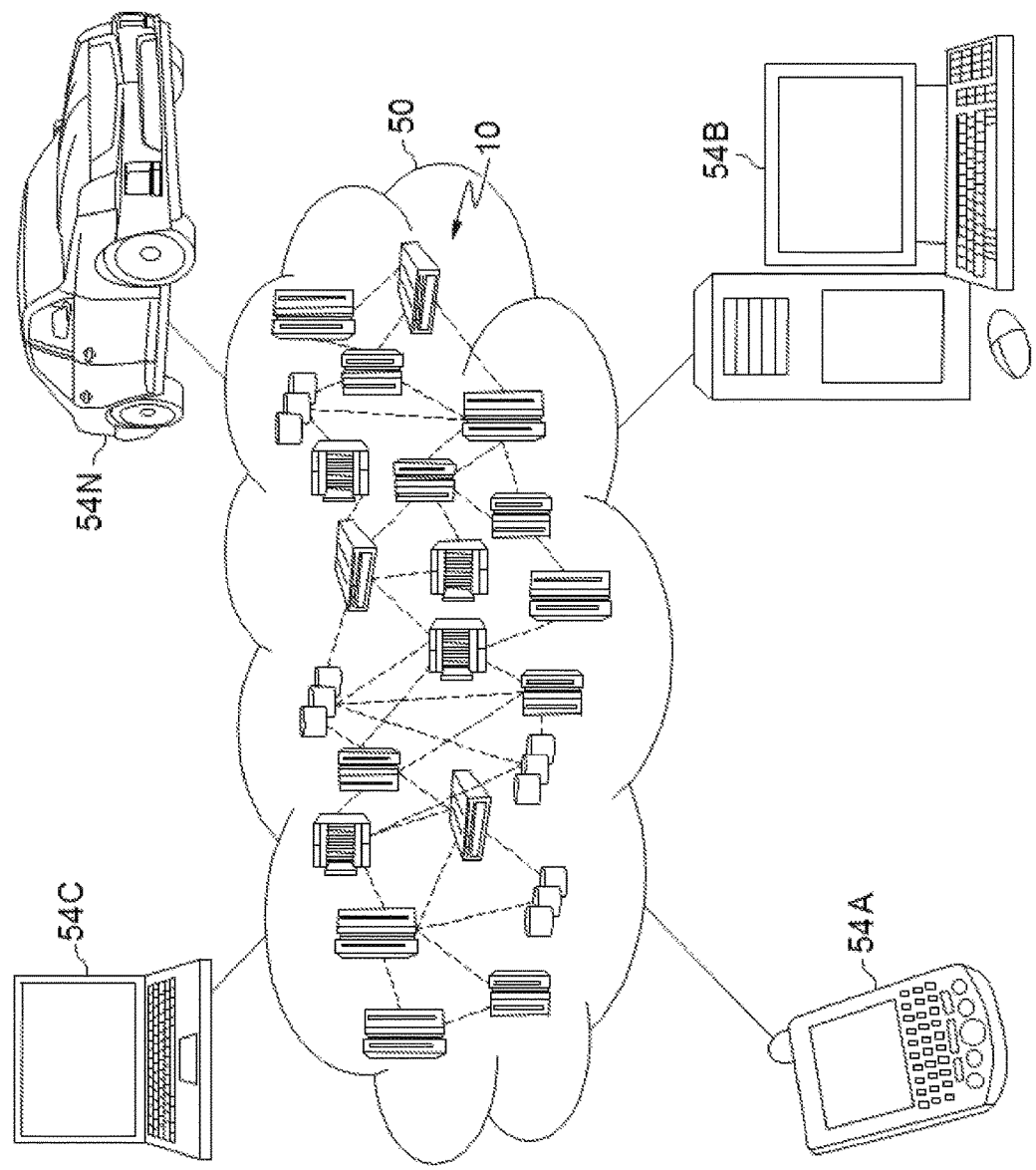
FIG. 1 depicts a cloud computing node according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
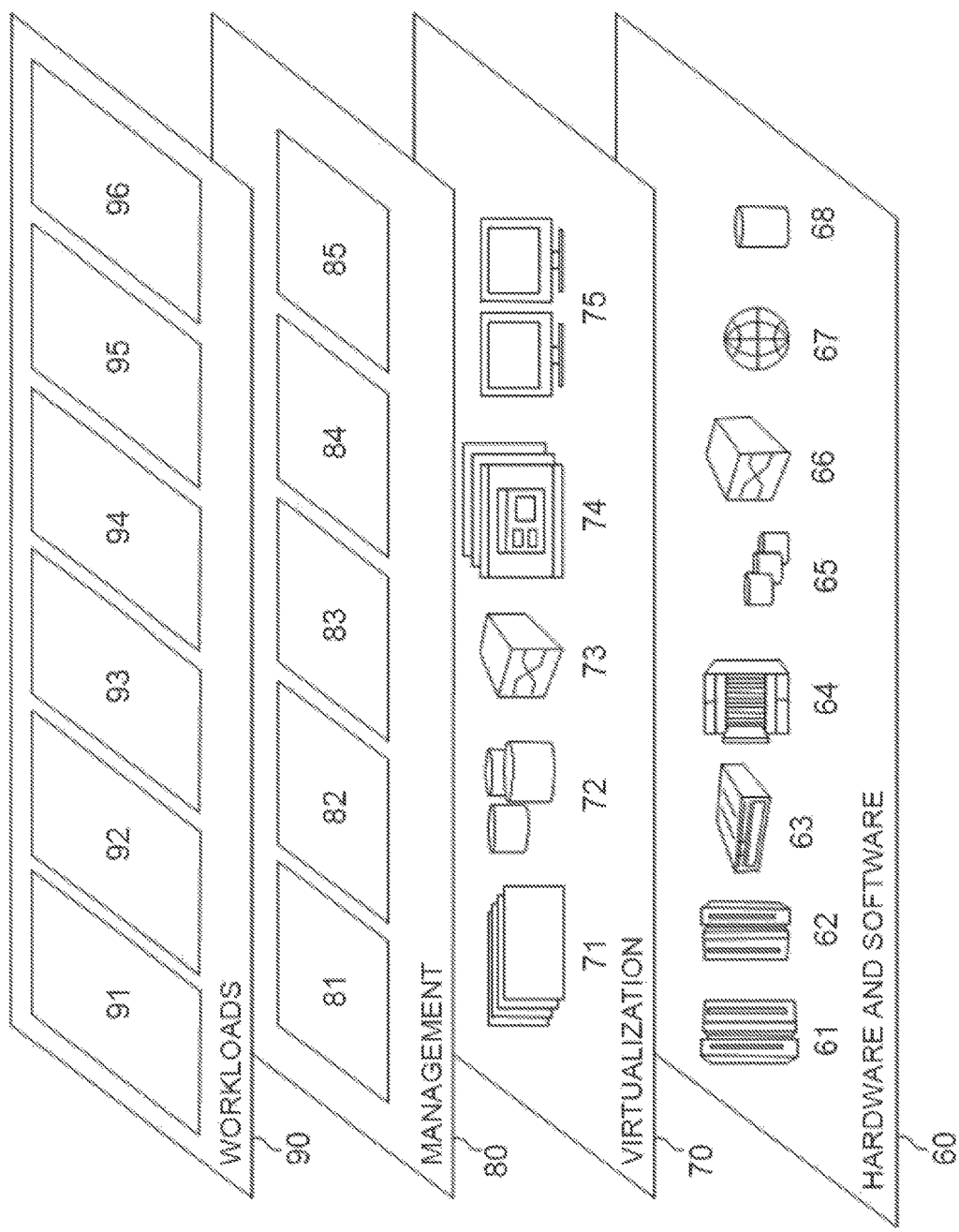
FIG. 2 depicts a cloud computing environment according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for an automated review validator as described below.

Figure 3:
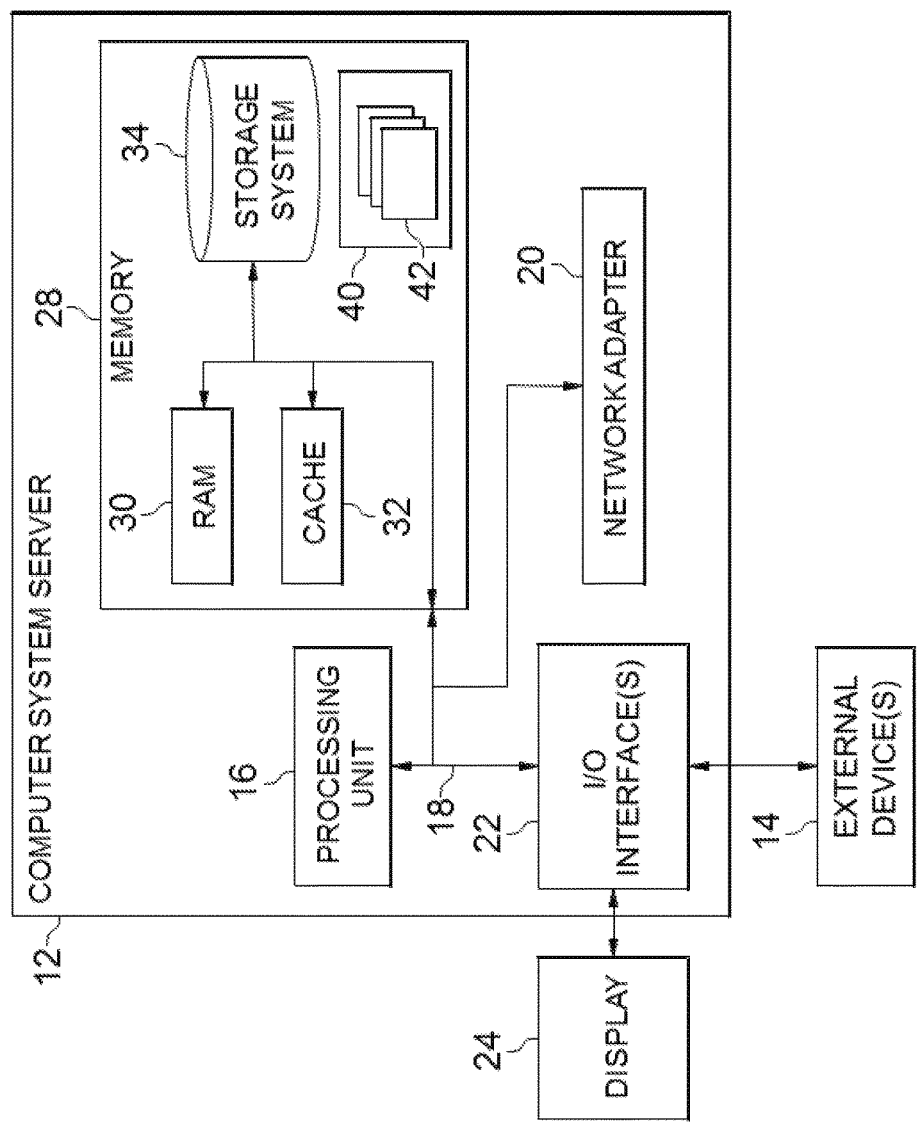
FIG. 3 depicts a computerized aspect according to an embodiment of the present invention.

FIG. 3 is a schematic of an example of a programmable device implementation 12 according to an aspect of the present invention, which may function as a cloud computing node within the cloud computing environment. Programmable device implementation 12 is only one example of a suitable implementation and is not intended to suggest any limitation as to the scope of use or functionality of embodiments of the invention described herein. Regardless, programmable device implementation 12 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The quality or value of a given review of a particular information technology (IT) item may be highly dependent on an encompassing processing environment that is defined by the behavior and execution of other processes, processing devices and network communications that are engaging and interacting with the IT item but are "external" to the IT item itself (hereinafter sometimes referred to as the "external context data"). The root-cause of a poor performance that forms the basis of a poor review may be based not on the actual performance of the reviewed information technology, but instead on the external context of an IT item performance that is particular to the reviewing user. The reviewer user may be experiencing poor current network conditions, low resource availability, or executing the application on a substandard or poorly performing device. The reviewer may also improperly use the reviewed technology or supporting operating systems, through impatience, inexperience or poor programming or general IT usage skills, etc. This situation is particularly common in reviewing mobile application behaviors, which is generally highly dependent on the external context in which the application runs.

Generally a reviewer must have knowledge or patience to investigate and determine that the actual reasons for a poor performance in using an IT item are due to external context and not to the item itself. Lacking this, the reviewer may in good faith but erroneously blame the IT item itself and write and submit a bad rating or review for the IT item. Since the review is erroneous in blaming the cause of performance problems on the IT item itself, rather the particular underlying external usage context of the reviewer, such a review is actually a "false negative" review with respect to the reviewed IT item. The reviewer may be appropriately observing poor performance by a reviewed IT item, but wherein the root-cause of the poor behavior is incorrectly attributed to the IT item itself, rather than an underlying context that is actually causing the problem and that may be entirely unrelated to performance attributes and quality of the reviewed IT item.

False negative reviews are essentially inaccurate with respect to qualities of the reviewed information technology, and should be disregarded in evaluating an IT item that operates adequately within normal external contexts that a user may expect to typically experience. It is also unfair to give poor ratings to applications and other IT items based on running the items in unfavorable context scenarios. Other users who do not share the context of the reviewer, and that will for the most part or even entirely use the technology in better contexts, are better served to disregard such false negative reviews, and instead consider other available reviews that are accurate as to the experience that the reader will likely experience in using the reviewed IT item, due to sharing a similar user external context of the other reviewers. This particularly true where the cause of a poor external context is due to incompetence or error of the reviewing user that has little or no chance of replication by other users.

The prior art provides mechanisms for identifying intentionally malicious or fake or untrustworthy reviews based on the identity of the reviewer (for example, via recognizing behavioral attributes, originating addresses or history of a reviewer that indicates an untrustworthy bias). However, such techniques merely exclude all reviews from a suspect reviewer, origin, etc., and offer no teachings as to making qualitative assessments that can distinguish good faith but erroneous, false negative reviews that should be disregarded, from other, legitimate negative reviews that accurately assess attributes of the reviewed IT item.

In contrast, aspects of the prior art provide advantages in automatically identifying false negative reviews, and providing mechanisms to distinguish them from other, more useful reviews, which may include removing them from consideration by (publication to) other users. Advantages are also provided over the prior art in enhancing reviewer privacy protections: by reducing or eliminating consideration of a reviewer's personal behavior history, aspects help to avoid unnecessarily acquiring, aggregating or sharing personal data of the reviewer, correspondingly reducing the risk of loss or disclosure of private, confidential information.

Figure 4:
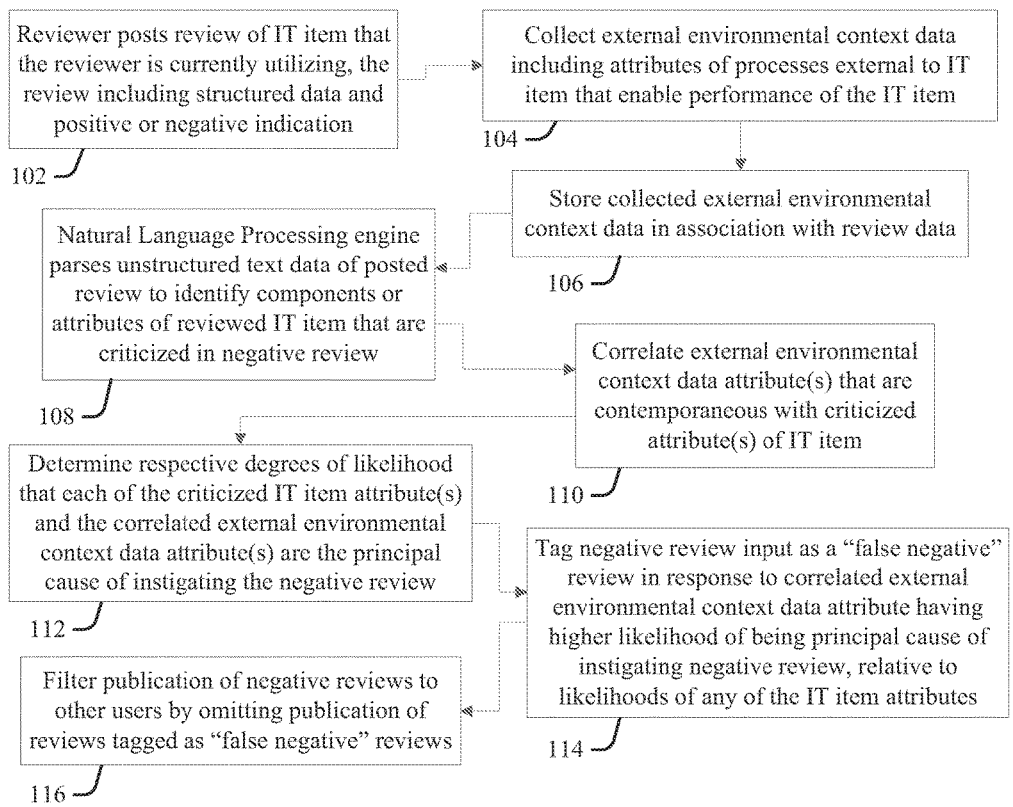
FIG. 4 is a flow chart illustration of a method or process according to an embodiment of the present invention for an automated review validator.

FIG. 4 (or "FIG. 4") illustrates a computer implemented method or process of an aspect of the present invention wherein a processor (for example, a central processing unit (CPU)) executes code, such as code installed on a storage device in communication with the processor, and thereby provides an automated review validator that functions as defined by the flowchart. Thus, at 102, a reviewing user (reviewer) posts or otherwise submits a review of an IT item that the reviewer is currently utilizing (using, executing, operating, etc.), wherein the posted review includes structured data that includes a designation of the review as a positive or a negative review.

In some aspects of the present invention, a review posting application is executing in the background on a programmable device operated by the reviewer, wherein at 102 a specific input from the reviewer invokes a pop-up window or dialog box on a graphical user interface (GUI) display device driven by the processor (on a mobile device or otherwise in communication with the processor). The pop-up dialog box is used by the reviewer to input the review as structured data, or as unstructured data within specified structured data categories.

Figure 5:
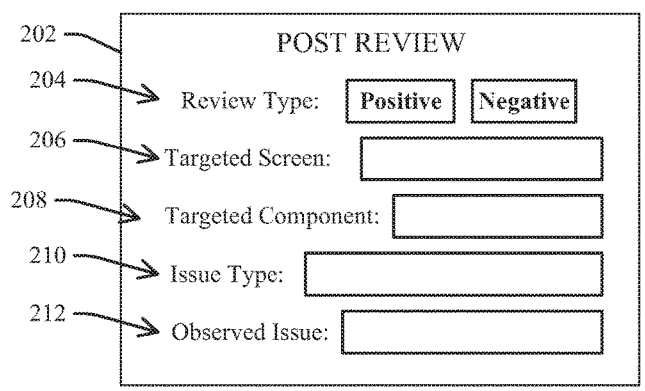
FIG. 5 is a graphic illustration of an example of a pop-up dialog box according to the present invention.

In one aspect, the reviewer quickly and easily invokes a pop-up dialog box at 102 by shaking a smart phone or other mobile programming device in a defined manner (for example, for a specified number of side-to-side motions, over a rate of speed of time period, etc.). FIG. 5 is a graphic illustration of an example of a pop-up dialog box 202 according to the present invention, which include various defined structured data fields for IT item data and attribute descriptions, a including "Review Type: Positive/Negative" field 204 which enables the reviewer to enter structured data indicative of whether the review is positive or negative via a binary choice input of one of two "Positive" and "Negative" buttons. Other examples (not shown) enable a qualitative value selection chosen from a rating scale, for example, to select a number of stars on a five-star scale, where one star is highly negative and five stars is highly positive, etc.

A "Targeted Screen" field 206 enables the reviewer to specify a screen name of a screen display image or window that is associated with a process or step of concern within an IT item application which is noteworthy or most important or germane to the review, such as one for which the reviewer feels excited or unsatisfied, or which otherwise provoked the reviewer to post the review. "Targeted Component" 208, "Issue Type" 210 and "Observed Issue" 212 fields in the dialog box also enable the user to provide additional detail or granularity as to particular attributes of the IT item germane to the review. The field items allow the input of unstructured text data content, or may include pull-down or auto-complete features with suggested, structured data choices that the reviewer selects.

In response to the posting of the review at 102, at 104, external environmental context data is collected or determined for the reviewed IT item itself (where the IT item is a programmable device), or for a programmable device or an external network environment that is used by the reviewer to utilize the reviewed IT item (where the IT item is an executing application, or a service accessed via network resources, etc.). The collected external environmental context data encompasses attributes, behavior, etc. of a processing environment that is defined by processes that include external software applications, processing devices, and network communications that are engaging or interacting with the IT item to enable the IT item to perform (in being utilized by the reviewer), but that are separate from ("external") to the IT item itself. The collected external environmental context data 104 is stored at 106 in association with the review data input at 102.

For example, wherein the IT item is an application executing on a mobile device, such as a phone "shaken" to invoke the pop-up dialog box (202, FIG. 5) that is used to post the review at 102, aspects collect context data for a collection time period that spans the times of invoking the pop-up dialog box through and submitting the review thereby at 102. The collection time period may be very short, for example five seconds or less. It may also span from an initial time defined as a specified number of seconds (for example, three) prior to the time of invoking the dialog box, to an ending time that is defined as a specified number of seconds after the time of submitting the review via the dialog box (for example, three); still other user defined collection time periods may be defined and practiced as needed.

External environmental context data collected at 104 includes the following illustrative but not limiting or exhaustive examples:

Client, network and server context logs.

Device CPU type and number, and amount and type of random access memory (RAM).

Volume Snapshot Service (VSS) or Volume Shadow Copy Service data, generally a backup copy or snapshot of computer files or volumes of the IT item (or the programmable device utilizing the IT item), including those currently in use during the collection time period.

Stack trace data, also known as "backtrace" or "stack traceback" data, which includes a report of active stack frames at a certain point in time during the execution of a program. When a program is run, memory may be dynamically allocated in two places, the stack and the heap, where memory is contiguously allocated on a stack but not on a heap; each time a function is called in a program, a block of memory is allocated on top of the runtime stack called the activation record, wherein at a high level an activation record allocates memory for the function's parameters and local variables declared in the function.

Data collected at 104 may also include one or more of method profiling, server load, thread details, kernel and application events, view hierarchy data, and still other appropriate data will be recognized by one skilled in the art.

In some aspects, the processes of invoking a review input dialog box 202 at 102 and receiving an input at 104 of populated dialog field data therefrom may take only seconds, which improves the likelihood that the external environmental context data acquisition at 104 is substantially contemporaneous with the processing environment context that gave rise to an underlying problem that prompted the reviewer to create and submit the negative review. This is in contrast to prior art techniques that rely on self-reporting of environmental conditions, and wherein the self-reporting may be submitted or assessed long after the event precipitating the review. Thus, aspects of the present invention provide advantages over the prior art in more quickly and accurately correlating posted review data with the mobile device operating context data, more strongly coupling the instant review posted with the captured mobile context, and helping the aspect to more accurately determine false negative scenarios as a function of determining the external processing context associated with issues triggering the negative review.

The present aspect of the invention discussed below and illustrated in FIG. 4 focuses on the recognition of negative reviews. However, alternative embodiments of the present invention (not shown) may identify and distinguish and rank false positive reviews in a similar fashion, as will be appreciated by one skilled in the art.

At 108 a Natural Language Processing (NLP) engine parses unstructured text data of the review data to identify one or more components or attributes of the reviewed IT item that are criticized in the negative review, for example by matching unstructured text string content within input fields of the dialog box (202, FIG. 5) to text names or attributes of the IT item. This process may also augment or complete structured data items suggested by pull-down or other auto-field mechanisms.

At 110 a defect prediction engine component correlates one or more attributes of the external environmental context data with the criticized components or other particular attributes of the IT item identified (at 102 or 108) as a function of contemporaneous times of occurrence, to identify (predict) an underlying cause of the observed defect or issue which provoked the user to initiate the negative review. Structured review data items, and parsing outputs of the unstructured data, are associated with structured data of the collected external environmental context data, with degrees of confidence and probability that are used to interpret or convert the collected external environmental context data to attribute or application-specific information data of the reviewed IT item at 110. For example, correlating a review field input at 102 of "login screen is loading slow" to external environmental context data view hierarchy and client, network and/or server context log data collected at 104 for a reviewed application executing on a mobile device enables determination of more specific details of the problem prompting the negative review: in response to identifying which of a plurality of different activity screens of the reviewed application is referred to the "login screen," as a function of the external context data for an instant or subset time period of the collection time period of a reviewer observation of the identified activity screen, which may be correlated to a time of appearance, or immediately before, of the identified activity screen, etc.

At 112 the process determines (predicts, infers) respective degrees of likelihood (strength or other objective valuation) that each of the criticized attributes of the reviewed IT item and attributes of the external environmental context data correlated thereto at 110 are the main or principal cause of instigating the negative review. The likelihood determinations at 112 include relative comparison and end-to-end testing applied to a defect or issue identified (predicted) with respect to the correlated external environmental context data attribute/component, and in some examples as a function of historic data from other running application or instances of the reviewed IT item (for example, analyzing the collected logs and comparing associated data with other similar log instances).

Illustrative but not exhaustive or limiting examples of correlated external environmental context data attributes that are identified at 112 as main or principal causes of instigating the negative review include:

(i) reviewer error, for example data entry errors or relatively poor coding skills, etc.;

(ii) poor network conditions, for example high packet data traffic congestion or low bandwidth availability or capacity;

(iii) unfavorable internal programmable device configuration with respect to a device used by the reviewer to utilize the IT item, for example high CPU or RAM loading, old or substandard mobile or other hardware device capacities and configurations, etc.;

(iv) unfavorable external programmable device context, for example high CPU, server or RAM loading, overloaded or insufficient network switching hardware or port allocations; and (v) incompatible end device configurations that compromise the ability of the reviewer's device to use and assess the IT item under review, for example via a mismatch between operating system or application software versions, which in some cases may be caused by older hardware that cannot be updated to better versions.

The determination of degrees of likelihood at 112 may be a function of relative rankings of correlated external environmental context data attributes/components to known problematic configurations within a knowledge base, so that those with strongest correlations to known problems are prioritized in testing and subsequent user and reviewer notifications. For example, for the input review data of "login screen is non-responsive," where the mobile context data collected at 104 indicates that available bandwidth at that moment is poor, and there are other application instances wherein the same login screen is responsive in good bandwidth, then the process may determine at 112 a stronger likelihood that the cause of observed problematic issue is the poor network condition of the external environmental context data relative to other correlated ones of the external environmental context data attributes/components, and also that it is highly unlikely to be a fault or defect instead of the IT item.

Comparison and testing at 112 comprehends client-side, end-to-end and context-based performance testing, and still other frames of reference may be practiced by one skilled in the art.

At 114 the process identifies (tags, labels, sets a field value or flag, etc.) the negative review input at 102 as a "false negative" review in response to a determination at 110 that one of the correlated external environmental context data attributes has a higher likelihood of being the main or principal cause of instigating the negative review than the criticized attribute (or any other attribute) of the reviewed IT item. Thus, the review is tagged as a "false negative" review if determined at 114 that it is more likely that one of the correlated external environmental context data attribute/components is the main or principal cause of instigating the negative review, relative to likelihoods of the attributes or performance of the reviewed IT item itself.

In some aspects, an optional process at 116 filters publication of negative reviews to other users by omitting publication of reviews tagged as "false negative" reviews at 114, such as in response to a search of a knowledge base that includes a plurality of user reviews of the IT item, including the review input at 102. Thus, in one advantage of the present invention a service provider is enabled to curate or filter user reviews returned as results in response to a user query (such as through a search box in a browser), improving the usefulness of the results by filtering out any reviews tagged as "false negative" at 114.

Figure 6:
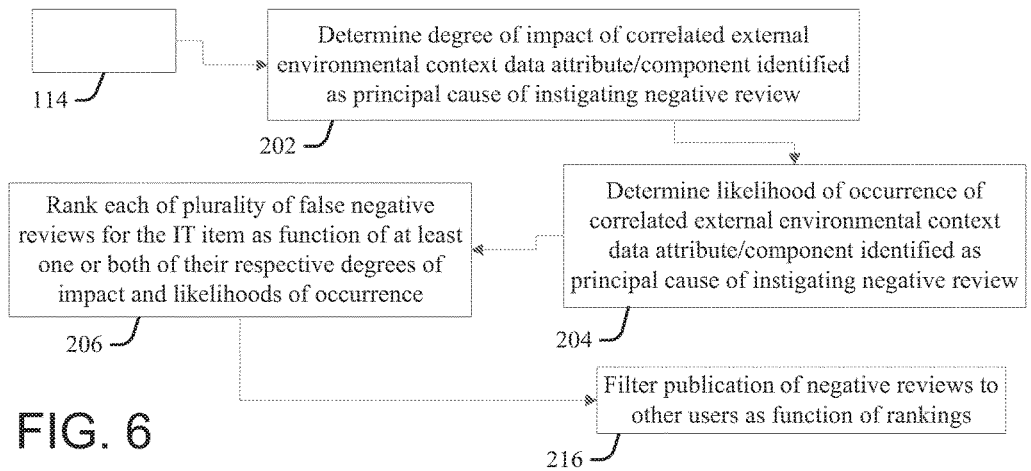
FIG. 6 is a flow chart illustration of another method or process according to an embodiment of the present invention for an automated review validator.

FIG. 6 illustrates another embodiment of the present invention, wherein the process prioritizes false negative reviews for the IT item based on the differences in respective degrees of relative impact and/or likelihoods of occurrence of the principal causes of instigating their respective, negative reviews. Thus, at 202 the process determines a degree of impact of the correlated external environmental context data attribute/component identified as the main or principal cause of instigating the negative review at 114. For example, a reviewer coding error determined as the main cause of instigating a negative review in a first false negative review may have a higher impact on a given correlated IT item performance than a poor network condition that is determined as the main cause of instigating a negative review in a second false negative review. Accordingly the first false negative review is assigned a higher impact value for ranking relative to the second false negative review, with respect to this IT item.

At 204 the process determines a likelihood of occurrence of the correlated external environmental context data attribute/component identified as the main or principal cause of instigating the negative review at 114. For example, the reviewer coding error determined as the main cause of instigating the negative review in the first false negative review may have a lower likelihood of occurrence than the poor network condition determined as the main cause of instigating the negative review in the second false negative review, and accordingly the first false negative review is assigned a lower likelihood of occurrence value for ranking relative to the second false negative review.

At 206 the process ranks each of a plurality of false negative reviews for the IT item (including the review input at 102, FIG. 4) as a function of at least one of their respective degrees of impact and likelihoods of occurrence, or a combination or function of both values. For example, they may be ranked for consideration as a function of their degrees of impact, but only including those that have likelihood of occurrence values that exceed a threshold minimum value.

Thus, in a variation of the process at 116 of FIG. 4, at 216 the process filters publication of negative reviews to other users by selectively omitting publication of reviews tagged as "false negative" reviews as a function of their rankings at 206. For example, false negative reviews having the lowest degrees of impact on the IT item and highest likelihoods of occurrence values that exceed a minimum (likely or probable) threshold value may be published, under an assumption that they do not strongly exclude a possibility that the IT item itself is at fault in generating the bad review, and in view of their likelihood in occurring during use of the IT item.

Figure 7:
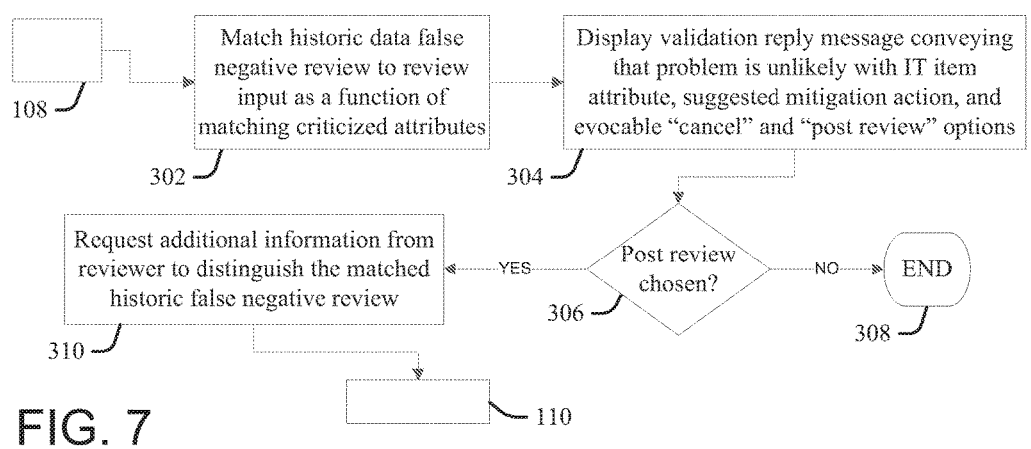
FIG. 7 is a flow chart illustration of another method or process according to an embodiment of the present invention for an automated review validator.

FIG. 7 illustrates another aspect or embodiment of the present invention that includes additional validation processes for submission of a review, via comparing review inputs to a knowledge base of false negative reviews. Thus, referring again to the example of FIG. 4, the next time a "login screen is non-responsive" review is input at 102 in a similar network delay scenario (as indicated by similarities in the context data uploaded or determined at 104), aspects may quickly retrieve the determination made in a previous iteration of the process at 110 of a matching false positive review and immediately inform the reviewer with information about a possible cause of the delay that is external to the IT item performance, along with cancel option for the user to terminate the process at that point of time.

More particularly, referring now to FIG. 7, subsequent to the step of parsing via the NLP engine the unstructured text data of the review data at 108 of FIG. 4 (wherein the criticized attribute of the reviewed IT item is recognized as the function of the unstructured and structured review data), at 302 a false negative review already submitted and stored in historic data is matched to the review input (at 102, FIG. 4) as a function of matching the criticized attribute of the reviewed IT item. More particularly, the matching historic review also criticizes the same component/attribute.

At 304 a validation reply message is created and displayed to the reviewer on the GUI display device. The validation reply conveys to the reviewer one or more of (i) a text message identifying the correlated external environmental context data attribute determined to be the principal cause of instigation of the matching, historic negative review (for example, as determined at 114, FIG. 4); (ii) that the current problem is not due (or unlikely due) to any problem with a performance attribute of the reviewed IT item itself; (iii) a suggested course of action to mitigate the problem prompting/underlying the false negative review input; (iv) an evocable "cancel" option that enables the reviewer to terminate entry of the negative review; and (v) an evocable "post review" option that enables the reviewer to nevertheless proceed to posting the review (thus, despite the (i) text message explanation of the underlying external issue).

Figure 8:
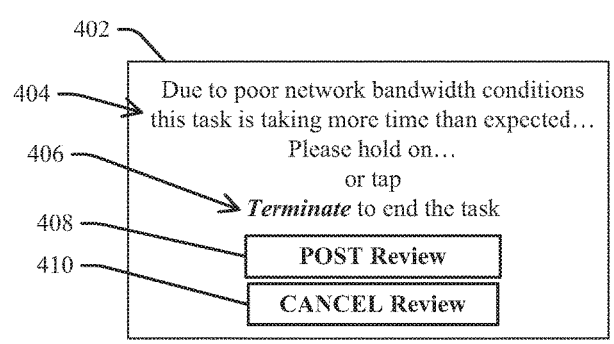
FIG. 8 is a graphic illustration of a reply message pop-up dialog window according to the present invention.

FIG. 8 is a graphic illustration of an example of a reply message pop-up dialog window 402 invoked at 304 (FIG. 7) that includes a (i) text message 404 that identifies the correlated external environmental context data attribute determined to be the principal cause of instigation of the matching, historic negative review, as the external issue that is actually causing the problem of concern of the reviewer: "Due to poor network bandwidth conditions this task is taking more time than expected . . . Please hold on . . . or tap Terminate to end the task," wherein the text term "Terminate is a hyperlink 406 to an action that ends the log-in task that is delayed. The displayed reply message also includes respective evocable (iv) "cancel" 410 and (v) "post review" 408 option radio buttons that enable the reviewer to effect the associated actions via a GUI routine selection (finger tap or swipe, mouse click, etc.).

Referring again to FIG. 7, if at 306 the reviewer chooses to wait for the process to complete, to terminate the process, or to cancel the review then the process ends at 308, cancelling the posting of the review input at 102 (FIG. 4). Otherwise, if at 306 the reviewer chooses option (v) to proceed with posting the negative review, then at 310 the GUI display is driven to request additional information (structured or unstructured data) from the reviewer to distinguish the matched historic false negative review, or to otherwise justify or explain the validity of the negative review input, wherein response data is input into the process at 110 (FIG. 4) to provide additional data for use in correlating the external environmental context data with the criticized components or other particular attributes of the IT item identified.

Thus, the embodiments of FIGS. 7 and 8 reduce the entry of false positive reviews by providing the reviewer with an alternative rationale for the problem prompting the negative review, and enabling the reviewer to change his or her mind and withdraw the review, or to further justify the negative review by providing additional information from structured or unstructured data inputs for consideration of the review input (at 110, FIG. 4).

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for an automated review validator, the method comprising executing on a computer processor the steps of:
   in response to a posting of a negative review by a reviewer of a performance of an information technology item, collecting external environmental context data that comprises a plurality of processing environment attributes of an external process that interacts with the information technology item in the reviewed performance of the information technology item, wherein the collected external environmental context data processing environment attributes are separate from and independent of an attribute of the information technology item that is criticized in the negative review posting and are selected from the group consisting of a data entry error, a coding error, high packet data traffic congestion, low bandwidth availability, low bandwidth capacity, high central processing unit loading, high random access memory loading, overloaded network switching hardware, insufficient port allocations, and a mismatch between operating system and application software versions;
   correlating the criticized attribute with a first processing environment attribute of the collected external environmental context data plurality of processing environment attributes as a function of determining that contemporaneous times of occurrence of the criticized attribute and the first processing environment attribute each occur within a collection time period that spans from a time of displaying a graphical user interface dialog box to the reviewer for posting the negative review to a time of the posting of the negative review via population by the reviewer of a plurality of different fields of the dialog box with data inputs, and of determining a historic correlation of the criticized attribute to the first processing environment attribute within a previous negative review;
   determining a likelihood that the criticized attribute is a root cause of the negative review as a function of matching the criticized attribute to attributes criticized in historic false negative review data;
   determining a likelihood that the first processing environment attribute is the root cause of the negative review as a function of a strength of correlation to a known problem within a knowledge base; and
   determining that the negative review is a false negative review in response to a higher likelihood that the first processing environment attribute is the root cause relative to the likelihood that the criticized attribute is the root cause.

2. The method of claim 1, wherein the step of determining the likelihood that the first processing environment attribute is the root cause of the negative review is further a function of comparison to historic log data from another executing instance of the information technology item.

3. The method of claim 1, further comprising:
   in response to a review indication input, driving a display device to display the graphical user interface dialog box to the reviewer, wherein the dialog box comprises the plurality of different fields for entry of data inputs;
   posting the negative review in response to an input of the different fields of the dialog box that are populated with data inputs; and
   generating structured review data from the data inputs populating the different fields of the dialog box.

4. The method of claim 3, wherein the different fields of the dialog box comprise:
   a review type field that is populated with one of positive review indication and negative review indication data inputs;
   a targeted attribute field that is populated with screen name or component name text data; and
   an observed issue attribute field that is populated with text data that is descriptive of an issue observed by the reviewer with respect to the performance of the information technology item.

5. The method of claim 1, wherein a length of the collection time period is less than five seconds.

6. The method of claim 1, wherein the step of collecting the external environmental context data comprises collecting data from the group consisting of:
   a client log;
   a network log;
   a server log;
   type and number of a device central processing unit;
   type and amount of random access memory;
   volume snapshot service data;
   stack trace report data;
   method profiling data;
   server load data;
   thread detail data;
   kernel event data; and
   view hierarchy data.

7. The method of claim 1, further comprising:
   integrating computer readable program code into a computer system comprising the processor, a computer readable memory in circuit communication with the processor, and a computer readable storage medium in circuit communication with the processor; and
   wherein the processor executes program code instructions stored on the computer-readable storage medium via the computer readable memory and thereby performs the steps of collecting the external environmental context data environment attributes in response to the posting of the negative review, correlating the criticized attribute with the first processing environment attribute of the collected external environmental context data plurality of processing environment attributes determining the likelihood that the criticized attribute is the root cause of the negative review and the likelihood that the first processing environment attribute is the root cause of the negative review, and determining that the negative review is the false negative review in response to the higher likelihood that the first processing environment attribute is the root cause relative to the likelihood that the criticized attribute is the root cause.

8. The method of claim 7, further comprising:
   providing the integrated computer-readable program code as a service in a cloud environment.

9. A system, comprising:
   a processor;
   a computer readable memory in circuit communication with the processor; and
   a computer readable storage medium in circuit communication with the processor;
   wherein the processor executes program instructions stored on the computer-readable storage medium via the computer readable memory and thereby:

in response to a posting of a negative review by a reviewer of a performance of an information technology item, collects external environmental context data that comprises a plurality of processing environment attributes of an external process that interacts with the information technology item in the reviewed performance of the information technology item, wherein the collected external environmental context data processing environment attributes are separate from and independent of an attribute of the information technology item that is criticized in the negative review posting and are selected from the group consisting of a data entry error, a coding error, high packet data traffic congestion, low bandwidth availability, low bandwidth capacity, high central processing unit loading, high random access memory loading, overloaded network switching hardware, insufficient port allocations, and a mismatch between operating system and application software versions;

correlates the criticized attribute with a first processing environment attribute of the collected external environmental context data plurality of processing environment attributes as a function of determining that contemporaneous times of occurrence of the criticized attribute and the first processing environment attribute each occur within a collection time period that spans from a time of displaying a graphical user interface dialog box to the reviewer for posting the negative review to a time of the posting of the negative review via population by the reviewer of a plurality of different fields of the dialog box with data inputs, and of determining a historic correlation of the criticized attribute to the first processing environment attribute within a previous negative review;

determines a likelihood that the criticized attribute is a root cause of the negative review as a function of matching the criticized attribute to attributes criticized in historic false negative review data;

determines a likelihood that the first processing environment attribute is the root cause of the negative review as a function of a strength of correlation to a known problem within a knowledge base; and determines that the negative review is a false negative review in response to a higher likelihood that the first processing environment attribute is the root cause relative to the likelihood that the criticized attribute is the root cause.

10. The system of claim 9, wherein the processor executes the program instructions stored on the computer-readable storage medium via the computer readable memory and thereby further:

in response to a review indication input, drives a display device to display the graphical user interface dialog box to the reviewer, wherein the dialog box comprises the plurality of different fields for entry of data inputs;

posts the negative review in response to an input of the different fields of the dialog box that are populated with data inputs; and generates structured review data from the data inputs populating the different fields of the dialog box.

11. The system of claim 10, wherein the different fields of the dialog box comprise:

a review type field that is populated with one of positive review indication and negative review indication data inputs;

a targeted attribute field that is populated with screen name or component name text data; and an observed issue attribute field that is populated with text data that is descriptive of an issue observed by the reviewer with respect to the performance of the information technology item.

12. The system of claim 10, wherein the collected external environmental context data is collected from the group consisting of:

a client log;
a network log;
a server log;
type and number of a device central processing unit;
type and amount of random access memory;
volume snapshot service data;
stack trace report data;
method profiling data;
server load data;
thread detail data;
kernel event data; and
view hierarchy data.

13. A computer program product for an automated review validator, the computer program product comprising:

a computer readable storage medium having computer readable program code embodied therewith, wherein the computer readable storage medium is not a transitory signal per se, the computer readable program code comprising instructions for execution by a processor that cause the processor to:

in response to a posting of a negative review by a reviewer of a performance of an information technology item, collect external environmental context data that comprises a plurality of processing environment attributes of an external process that interacts with the information technology item in the reviewed performance of the information technology item, wherein the collected external environmental context data processing environment attributes are separate from and independent of an attribute of the information technology item that is criticized in the negative review posting and are selected from the group consisting of a data entry error, a coding error, high packet data traffic congestion, low bandwidth availability, low bandwidth capacity, high central processing unit loading, high random access memory loading, overloaded network switching hardware, insufficient port allocations, and a mismatch between operating system and application software versions;

correlate the criticized attribute with a first processing environment attribute of the collected external environmental context data plurality of processing environment attributes as a function of determining that contemporaneous times of occurrence of the criticized attribute and the first processing environment attribute each occur within a collection time period that spans from a time of displaying a graphical user interface dialog box to the reviewer for posting the negative review to a time of the posting of the negative review via population by the reviewer of a plurality of different fields of the dialog box with data inputs, and of determining a historic correlation of the criticized attribute to the first processing environment attribute within a previous negative review;

determine a likelihood that the criticized attribute is a root cause of the negative review as a function of matching the criticized attribute to attributes criticized in historic false negative review data;

determine a likelihood that the first processing environment attribute is the root cause of the negative review as a function of a strength of correlation to a known problem within a knowledge base; and determine that the negative review is a false negative review in response to a higher likelihood that the first processing environment attribute is the root cause relative to the likelihood that the criticized attribute is the root cause.

14. The computer program product of claim 13, wherein the computer readable program code instructions for execution by the processor further cause the processor to:

in response to a review indication input, drive a display device to display the graphical user interface dialog box to the reviewer, wherein the dialog box comprises the plurality of different fields for entry of data inputs;

post the negative review in response to an input of the different fields of the dialog box that are populated with data inputs; and generate structured review data from the data inputs populating the different fields of the dialog box.

15. The computer program product of claim 14, wherein the different fields of the dialog box comprise:

a review type field that is populated with one of positive review indication and negative review indication data inputs;

a targeted attribute field that is populated with screen name or component name text data; and an observed issue attribute field that is populated with text data that is descriptive of an issue observed by the reviewer with respect to the performance of the information technology item.

16. The computer program product of claim 14, wherein the collected external environmental context data is collected from the group consisting of:

a client log;

a network log;

a server log;

type and number of a device central processing unit;

type and amount of random access memory;

volume snapshot service data;

stack trace report data;

method profiling data;

server load data;

thread detail data;

kernel event data; and view hierarchy data.

\* \* \* \* \*